US008408634B2

(12) United States Patent
Jungert

(10) Patent No.: US 8,408,634 B2
(45) Date of Patent: Apr. 2, 2013

(54) PNEUMATIC SYSTEM

(75) Inventor: Dieter Jungert, Weissach (DE)

(73) Assignee: Dr. Ing. H.C. F. Porsche Aktiengesellschaft (DE)

( * ) Notice: Subject to any disclaimer, the term of this patent is extended or adjusted under 35 U.S.C. 154(b) by 115 days.

(21) Appl. No.: 12/831,315

(22) Filed: Jul. 7, 2010

(65) Prior Publication Data

US 2011/0018306 A1 Jan. 27, 2011

(30) Foreign Application Priority Data

Jul. 24, 2009 (DE) ......................... 10 2009 034 721

(51) Int. Cl.
*B62D 37/02* (2006.01)
*F15B 1/027* (2006.01)

(52) U.S. Cl. .................. 296/180.1; 180/165; 296/65.01; 297/464

(58) Field of Classification Search ........................ None
See application file for complete search history.

(56) References Cited

U.S. PATENT DOCUMENTS

| | | | | |
|---|---|---|---|---|
| 4,271,869 | A * | 6/1981 | Weidl et al. | 138/30 |
| 5,797,262 | A | 8/1998 | Omoto | |
| 7,040,690 | B2 | 5/2006 | Soja et al. | |
| 2007/0045377 | A1 | 3/2007 | Towfighi | |
| 2009/0079155 | A1 | 3/2009 | Rehra et al. | |

FOREIGN PATENT DOCUMENTS

| | | |
|---|---|---|
| DE | 1555145 | 8/1970 |
| DE | 3709164 | 9/1988 |
| DE | 9014601 | 2/1991 |
| DE | 19724015 | 12/1998 |
| DE | 102 03 681 | 8/2003 |
| DE | 10 2004 038 705 | 4/2006 |
| DE | 102006012459 | 9/2007 |
| EP | 1 319 585 | 2/2007 |

* cited by examiner

*Primary Examiner* — Glenn Dayoan
*Assistant Examiner* — Jason S Daniels
(74) *Attorney, Agent, or Firm* — Gerald E. Hespos; Michael J. Porco; Matthew T. Hespos

(57) ABSTRACT

A pneumatic system has a compressor (8), a pneumatic reservoir (20) for a gaseous pressure transmission medium, at least one valve device (12) and at least one pneumatically actuable actuator (4). To provide satisfactory functioning even under extreme temperatures, and to provide a simple cost effective construction, the pneumatic reservoir (20) to which the compressor (8) is connected has a variable volume.

17 Claims, 1 Drawing Sheet

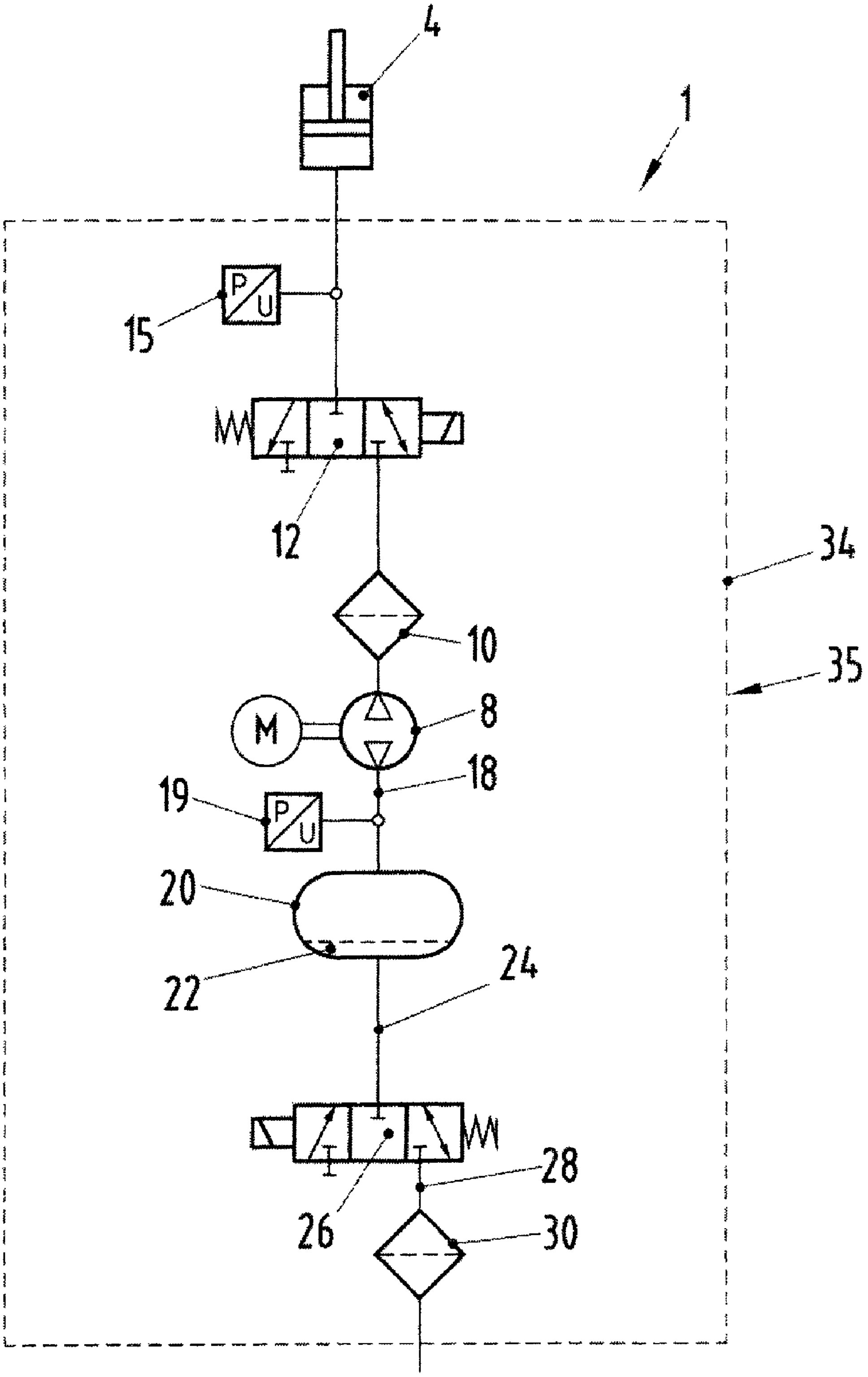
4
1
P/U
15
12
34
10
35
M
8
18
19
P/U
20
22
24
28
26
30

PNEUMATIC SYSTEM

CROSS-REFERENCE TO RELATED APPLICATIONS

This application claims priority under 35 USC 119 to German Patent Application No. 10 2009 034 721.6 filed on Jul. 24, 2009, the entire disclosure of which is incorporated herein by reference.

BACKGROUND OF THE INVENTION

1. Field of the Invention

The invention relates to a pneumatic system with a compressor, a pneumatic reservoir for a gaseous pressure transmission medium, at least one valve device and at least one pneumatically actuable actuator.

2. Description of the Related Art

EP 1 319 585 B1 discloses a motor vehicle with an air-guiding device that has a pneumatic actuating element to shift the air-guiding device from an inoperative position into an active position. DE 10 2004 038 705 B3 discloses a compressed air system of a motor vehicle with an intermediate compressed-air reservoir and a main compressed-air reservoir that can be filled with air through an air dryer. DE 102 03 681 A1 discloses a closed pneumatic system with a reservoir tank in which a gaseous medium is present below a threshold temperature at least partly in a liquid state of aggregation and/or in a form bound chemically to a liquid or solid agent. At least one cavity is connected to the reservoir tank and has a variable volume.

It is the object of the invention to provide a pneumatic system with a compressor, a pneumatic reservoir for a gaseous pressure transmission medium, at least one valve device and at least one pneumatically actuable actuator that function satisfactorily even under extreme temperatures. The pneumatic system of the invention should be constructed in a simple manner and be producible cost-effectively.

SUMMARY OF THE INVENTION

The relates to a pneumatic system with a compressor, a pneumatic reservoir for a gaseous pressure transmission medium, at least one valve device and at least one pneumatically actuable actuator. The pneumatic reservoir has a variable volume to which the compressor is connected. The variable volume affords the advantage that the gaseous pressure transmission medium can be stored unpressurized or at low pressure or at a small pressure in the pneumatic reservoir. The compressor enables the gaseous pressure transmission medium to be conveyed out of the pneumatic reservoir into the actuator or out of the actuator into the pneumatic reservoir. Thus a closed system that can be operated with dry air or with a substitute gas, such as nitrogen, is provided in a simple manner. An undesired freezing up of the actuator is prevented reliably even in the event of extremely low temperatures.

The pneumatic reservoir preferably is a low-pressure reservoir and is designed to be unpressurized. Thus, the pneumatic reservoir can acted upon by atmospheric pressure or normal pressure or by a slight positive pressure of approximately one bar.

The pneumatic system preferably is characterized in that the compressor is configured for a pressure of less than two bar, and most preferably is configured for a pressure of approximately 1.2 bar. As a result, the costs for the pneumatic system can be kept low.

The compressor preferably is between the reservoir and the actuator so that, during operation of the compressor, gaseous pressure transmission medium is either conveyed out of the reservoir or into the reservoir, the volume of the reservoir decreasing or increasing. The compressor may be a vane compressor that can be operated in opposite directions of rotation. However, the compressor also may be designed as a piston compressor that can be operated with the aid of changeover valves so that the pressure transmission medium is conveyed by the compressor either into the actuator or into the reservoir.

The reservoir may be formed from a flexible and/or elastic material. The reservoir volume can be delimited, for example, by a flexible plastics film arranged within a cage-like housing. The variable volume reservoir affords the advantage of being adapted in a simple manner to construction spaces of differing size or differing design.

The reservoir preferably is connectable to surroundings via a shut-off valve. The shut-off valve can be opened so that ambient air can flow into the reservoir if a quantity of pressure transmission medium stored in the reservoir is not sufficient to supply the actuator with pressure transmission medium via the compressor. Pressure losses from the closed system, for example due to leakage, can be compensated for in a simple manner by opening the shut-off valve.

The pneumatic reservoir may contain a drying agent. Only a small quantity of drying agent is required since the system normally is closed and is opened by opening of the shut-off valve only to compensate for pressure losses.

The valve device preferably is connected between the compressor and the actuator. The valve device serves to actuate the actuator with the aid of the compressor.

The pneumatic system may also comprise a plurality of actuators and/or a plurality of valve devices.

A microfilter preferably is connected between the compressor and the valve device. Thus, impurities in the form of abraded particles or dust from the compressor cannot enter the valve devices. Accordingly, the microfilter prevents an undesirable soiling or clogging up of the valve device.

A pressure sensor preferably is connected between the reservoir and the compressor. The pressure sensor preferably activates the above-described shut-off valve.

A pressure sensor preferably is connected between the valve device and the actuator. The pressure sensor preferably controls actuation of the actuator.

The invention also relates to a motor vehicle with the above-described pneumatic system. The actuator may be a driving element for a spoiler or for a raisable top of the motor vehicle. However, the pneumatic system may also comprise actuators of a pneumatic chassis, of an active seat system or of an actuating means for a head restraint.

Further advantages, features and details of the invention emerge from the description below in which an exemplary embodiment is described in detail with reference to the drawing.

BRIEF DESCRIPTION OF THE DRAWING

The FIGURE is a pneumatic circuit diagram of a pneumatic system according to the invention.

DETAILED DESCRIPTION OF THE PREFERRED EMBODIMENT

The FIGURE is a pneumatic circuit diagram of a pneumatic system 1 with an actuator 4. The actuator 4 may be a pneumatic cylinder with a piston that is movable in opposite directions by actuation of a compressor 8. The compressor 8 is driven by a motor M, for example by an electric motor. The two arrows within the compressor 8 indicate that pressure transmission medium can be conveyed into the actuator 4 and out of the actuator 4 with the aid of the compressor 8.

A microfilter 10 is connected adjacent to the compressor 8 and upstream of a valve device 12 that functions to actuate the actuator 4. The valve device 12 is an electromagnetically actuable 3/3-way directional control valve that is prestressed into the central position illustrated. A pressure sensor 15 is connected between the valve device 12 and the actuator 4.

The compressor 8 is connected to a pneumatic reservoir 20 via a pneumatic line 18, the pressure in which is detected by a further pressure sensor 19. According to an essential aspect of the invention, the pneumatic reservoir 20 has a variable volume and is acted upon with low pressure. A relatively small amount of drying agent 22 is contained in the pneumatic reservoir 20.

The pneumatic reservoir 20 is connectable to the surroundings via a further pneumatic line 24. For this purpose, the pneumatic line 24 is connected to a shut-off valve 26 that is connected to the surroundings via a further pneumatic line 28 that has a further filter 30. The shut-off valve 26 is an electromagnetically actuable 3/3-way directional control valve that is prestressed into its central position illustrated.

An interior of a motor vehicle 35 is indicated by a dashed line 34. The actuator 4 preferably is arranged outside the vehicle interior 34 and accordingly is exposed to extreme temperatures depending on the weather. The actuator 4, for example, functions to extend or raise and then retract or lower a spoiler of the motor vehicle 35 depending on requirements.

The pneumatic system 1 can be filled, for example via the pneumatic line 28, with a gaseous pressure transmission medium. The pressure transmission medium preferably is completely dehumidified air or a substitute gas, such as nitrogen. The pressure transmission medium is stored in the pneumatic reservoir 20 but, according to an essential aspect of the invention, is acted upon only by low pressure.

The pressure transmission medium is removed from the pneumatic reservoir 20 with the aid of the compressor 8 and, depending on requirements, is supplied in a targeted manner to the actuator 4 via the valve device 12. The effect achieved by the variable volume of the reservoir 20 is that a negative pressure or vacuum is not produced in the pneumatic reservoir 20 during the removal of the pressure transmission medium.

The compressor 8 is operated in the reverse direction when the actuator 4 is reset. Thus, the pressure transmission medium that escapes from the actuator 4 is brought back to low pressure or normal pressure and is fed back to the pneumatic reservoir 20. The volume of the pneumatic reservoir 20 is increased again by the return of the pressure transmission medium from the actuator 4 via the compressor 8.

The shut-off valve 26 compensates for leakages in the system, which otherwise is closed. The shut-off valve 26 is opened so that ambient air flows into the pneumatic reservoir 20 if the pressure sensor 19 determines that the amount of pressure transmission medium stored in the pneumatic reservoir 20 is not sufficient to supply the actuator 4 with pressure transmission medium via the compressor 8. The ambient air flowing in is dried by the drying agent 22 in the pneumatic reservoir 20.

What is claimed is:

1. A pneumatic system comprising:

at least one pneumatically actuable actuator for actuating a movable component of a vehicle;

a variable volume pneumatic reservoir for storing a gaseous pressure transmission medium that can be conveyed from the reservoir to the actuator or conveyed from the actuator to the reservoir;

a compressor connected in series between the actuator and the reservoir for selectively conveying the gaseous pressure transmission medium from the reservoir to the actuator or from the actuator to the reservoir;

a 3-way valve connected in series between the actuator and the compressor for selectively permitting the compressor to convey either a flow of the gaseous pressure transmission medium from the reservoir to the actuator or from the actuator to the reservoir and for selectively preventing a flow of the gaseous pressure transmission medium to or from the actuator.

2. The pneumatic system of claim 1, wherein the pneumatic reservoir is a low-pressure reservoir.

3. The pneumatic system of claim 2, wherein the compressor is configured for a pressure of less than two bar.

4. The pneumatic system of claim 1, wherein the compressor is operative for selectively conveying the gaseous pressure transmission medium either out of the pneumatic reservoir or into the pneumatic reservoir, thereby decreasing or increasing the volume of the pneumatic reservoir.

5. The pneumatic system of claim 1, wherein the pneumatic reservoir is formed from a flexible or elastic material.

6. The pneumatic system of claim 1, wherein the system is a normally closed system and further comprises a shut-off valve connectable to surrounding for selectively resupplying the reservoir with the gaseous pressure transmission.

7. The pneumatic system of claim 1, wherein the pneumatic reservoir contains a drying agent.

8. The pneumatic system of claim 1, further comprising a microfilter between the compressor and the valve device.

9. The pneumatic system of claim 1, further comprising a pressure sensor between the pneumatic reservoir and the compressor.

10. The pneumatic system of claim 1, further comprising a pressure sensor between the valve device and the actuator.

11. A motor vehicle, comprising:

at least one movable component; and a pneumatic system for driving the movable component, the pneumatic system comprising:

a pneumatically actuable actuator;

a variable volume pneumatic reservoir for storing a gaseous pressure transmission medium that can be conveyed either out of the pneumatic reservoir toward the actuator or from the actuator into the pneumatic reservoir, thereby decreasing or increasing the volume of the pneumatic reservoir a compressor connected in series between the actuator and the pneumatic reservoir for selectively conveying the gaseous pressure transmission medium from the pneumatic reservoir to the actuator or from the actuator to the pneumatic reservoir;

a 3-way valve connected in series between the actuator and the compressor for selectively permitting the compressor to convey either a flow of the gaseous pressure transmission medium from the pneumatic reservoir to the actuator or from the actuator to the pneumatic reservoir and for selectively preventing a flow of the gaseous pressure transmission medium to or from the actuator.

12. The motor vehicle of claim 11, wherein the movable component is a rear spoiler.

13. The motor vehicle of claim 11, wherein the movable component is an actuator of a pneumatic chassis, an active seat system or a head restraint.

14. The motor vehicle of claim 11, wherein the pneumatic reservoir is formed from a flexible material.

15. The motor vehicle of claim 11, wherein the pneumatic reservoir is formed from an elastic material.

16. The motor vehicle of claim 11, wherein the pneumatic reservoir is connectable to surroundings via a shut-off valve.

17. The motor vehicle of Claim 16, further comprising a microfilter between the compressor and the valve device.

* * * * *